United States Patent
McTeggart et al.

(10) Patent No.: US 11,537,708 B1
(45) Date of Patent: Dec. 27, 2022

(54) PASSWORD SEMANTIC ANALYSIS PIPELINE

(71) Applicant: Rapid7, Inc., Boston, MA (US)

(72) Inventors: Ralph McTeggart, Belfast (GB); Karin Gemmert, Belfast (GB)

(73) Assignee: Rapid7, Inc., Boston, MA (US)

( * ) Notice: Subject to any disclaimer, the term of this patent is extended or adjusted under 35 U.S.C. 154(b) by 414 days.

(21) Appl. No.: 16/747,844

(22) Filed: Jan. 21, 2020

(51) Int. Cl.
| | | |
|---|---|---|
| *G06F 21/00* | (2013.01) | |
| *G06F 21/46* | (2013.01) | |
| *G06N 20/00* | (2019.01) | |
| *G06N 5/04* | (2006.01) | |
| *G06F 40/30* | (2020.01) | |
| *G06F 40/284* | (2020.01) | |
| *H04L 9/40* | (2022.01) | |
| *G06Q 50/26* | (2012.01) | |

(52) U.S. Cl.
CPC ............ *G06F 21/46* (2013.01); *G06F 40/284* (2020.01); *G06F 40/30* (2020.01); *G06N 5/04* (2013.01); *G06N 20/00* (2019.01); *H04L 63/1433* (2013.01); *G06Q 50/265* (2013.01)

(58) Field of Classification Search
CPC ........ G06F 21/46; G06F 40/284; G06F 40/30; G06N 5/04; G06N 20/00; H04L 63/1433; G06Q 50/265
See application file for complete search history.

(56) References Cited

U.S. PATENT DOCUMENTS

| | | | | |
|---|---|---|---|---|
| 8,621,642 | B2 * | 12/2013 | Bjorn | G06F 21/46 |
| | | | | 713/168 |
| 9,544,325 | B2 * | 1/2017 | Foster | H04L 63/1425 |
| 9,805,187 | B1 * | 10/2017 | Jancula | G06F 21/46 |
| 10,176,318 | B1 * | 1/2019 | Kane-Parry | G06F 21/46 |
| 10,250,574 | B1 * | 4/2019 | Mossoba | G06F 16/248 |
| 10,541,993 | B2 * | 1/2020 | Johansson | H04L 9/3271 |
| 10,614,208 | B1 * | 4/2020 | Edwards | G06F 21/45 |
| 10,860,704 | B1 * | 12/2020 | Edwards | G06F 21/44 |
| 10,909,235 | B1 * | 2/2021 | Farivar | G06F 21/46 |
| 10,944,791 | B2 * | 3/2021 | Livny | G06N 3/08 |
| 11,163,872 | B1 * | 11/2021 | Marimuthu | H04L 63/205 |

(Continued)

FOREIGN PATENT DOCUMENTS

WO  WO-2013109330 A2 * 7/2013 ............. G06F 21/46

*Primary Examiner* — Don G Zhao
(74) *Attorney, Agent, or Firm* — Ashwin Anand (57) ABSTRACT

Disclosed herein are methods, systems, processes, and machine learning paradigms to implement a password semantic analysis pipeline. A password semantic analysis pipeline model is trained according to one or more machine learning techniques to at least (a) determine, based on given characteristics data of a given network environment, whether each of several tokens that are chunked portions of a data structure input as a password in an application is a known syntax type or a recognized entity, (b) generate, using the password semantic analysis pipeline model, a password strength score that is a combination of a confidence score determined for each of the plurality of tokens and a weight factor assigned to the known syntax type or the recognized entity, (c) apply the password strength score to the data structure input as the password in the application, and (d) provide an output to the application indicating whether the data structure input as the password is acceptable or unacceptable for continued access to the application.

18 Claims, 4 Drawing Sheets

(56) References Cited

U.S. PATENT DOCUMENTS

| | | | | |
|---|---|---|---|---|
| 2003/0033194 A1* | 2/2003 | Ferguson | ............. | G06K 9/6269 |
| | | | | 705/7.29 |
| 2003/0033587 A1* | 2/2003 | Ferguson | ............... | G06Q 10/04 |
| | | | | 717/104 |
| 2003/0130899 A1* | 7/2003 | Ferguson | ............... | G06Q 30/06 |
| | | | | 705/26.1 |
| 2009/0313696 A1* | 12/2009 | Himberger | ............... | G06F 21/46 |
| | | | | 726/22 |
| 2012/0284783 A1* | 11/2012 | Jakobsson | ............ | H04L 63/083 |
| | | | | 726/6 |
| 2013/0232562 A1* | 9/2013 | Rodriguez | ............ | G06F 21/316 |
| | | | | 726/5 |
| 2013/0283337 A1* | 10/2013 | Schechter | ............... | G06F 21/46 |
| | | | | 726/1 |
| 2015/0220715 A1* | 8/2015 | Kim | ........................ | G06F 21/32 |
| | | | | 726/18 |
| 2017/0289168 A1* | 10/2017 | Bar | ....... | H04L 63/102 |
| 2017/0353555 A1* | 12/2017 | Lauer | ..................... | H04L 63/107 |
| 2019/0057210 A1* | 2/2019 | Aelkatwad | ............. | G06F 21/46 |
| 2020/0026847 A1* | 1/2020 | Botti | ..................... | G06F 21/604 |
| 2020/0097560 A1* | 3/2020 | Kulkarni | ............... | G06F 16/248 |
| 2020/0134165 A1* | 4/2020 | Boodaei | ................ | H04L 63/083 |
| 2020/0143036 A1* | 5/2020 | Sunkavally | ............. | G06F 21/46 |
| 2020/0143037 A1* | 5/2020 | Sunkavally | ............. | H04L 63/20 |
| 2020/0257811 A1* | 8/2020 | Tatarinov | ............. | G06F 21/6218 |
| 2020/0310749 A1* | 10/2020 | Miller | ..................... | G06F 3/167 |
| 2021/0097168 A1* | 4/2021 | Patel | .................. | H04L 63/1416 |

\* cited by examiner

PASSWORD SEMANTIC ANALYSIS PIPELINE

BACKGROUND

Field of the Disclosure

This disclosure is related to password analysis and validation in computing systems. In particular, this disclosure is related to a password semantic analysis pipeline.

Description of the Related Art

Safe and secure user experience in modern computing environments is significantly dependent on passwords. A typical computing system, web application, or mobile application requires password validation of a user-entered password. Therefore, given the security risks associated with personal information (e.g., healthcare or financial records), the challenge of selecting and using strong passwords is paramount.

Unfortunately, the conventional computer user typically selects a simple and guessable, albeit memorable, password (e.g., the name of their dog followed by the year of their birth). In cybersecurity computing environments, the problem of compromised passwords that appear relatively strong on their face (e.g., a mix of letters, numbers, and symbols) but are comparatively weak (e.g., the mix of letters, numbers, and symbols, while unique in combination, are fairly easily predictable), is a pressing security-related issue.

SUMMARY OF THE DISCLOSURE

Disclosed herein are methods, systems, processes, and machine learning models and methodologies for creating, implementing, and managing a password semantic analysis pipeline in cybersecurity computing environments. One such method involves receiving a data structure that is input as a password in an application and transmitting the data structure that is input as the password in the application to a machine learning (ML) model. In this example, the ML model implements and executes a password semantic analysis pipeline by processing the data structure to perform password validation.

In one embodiment, processing the data structure using the ML model involves at least: (1) chunking the data structure into a tokens (e.g., chunks) that include text and/or numbers, (2) for each token, applying one or more Natural Language Processing (NLP) methodologies to determine whether a token is a known syntax or a recognized entity, (3) based on the applying, generating a confidence score for the token, (4) determining whether the token is actionable (e.g., whether the token is significant) by combining or amalgamating the confidence score for the token with a pre-determined weight factor associated with the known syntax or the recognized entity, and (5) finally, generating a master password score for the data structure. In this example, the master password score is transmitted to the application.

In some embodiments, the method involves accessing a list of commonly used passwords and applying Levenshtein distance to determine whether the data structure is proximate to at least one password in the list of commonly used passwords. In this example, the recognized entity includes at least a commercial term, a date, an event, a location, an organization, a person, a quantity, or a title. In other embodiments, the method involves processing the data structure using a NLP methodology in the ML model to determine whether the token is a verb or a noun and adjusting the pre-determined weight factor associated with the known syntax type or the recognized entity. In certain embodiments, the ML model can also be provided with a mapping of special characters to regular characters.

In some embodiments, the methods, systems, and processes disclosed herein implement a password semantic analysis pipeline model trained according to a machine learning technique to determine, based on given characteristics data of a given network environment, whether each of a plurality of tokens that are chunked portions of a data structure input as a password in an application is a known syntax type or a recognized entity, generate, using the password semantic analysis pipeline model, a password strength score that is a combination of a confidence score determined for each of the plurality of tokens and a weight factor assigned to the known syntax type or the recognized entity, apply the password strength score to the data structure input as the password in the application, and provide an output to the application indicating whether the data structure input as the password is acceptable or unacceptable for continued access to the application.

In other embodiments, the password semantic analysis pipeline system is implemented as part of a network-accessible service and is configured to collect the characteristics data from one or more physical computing devices or one or more virtual computing devices in the given network environment and provide the output indicating that the data structure input as the password is acceptable or unacceptable via a graphical user interface (GUI) of the network-accessible service. In this example, the network-accessible service is configured to monitor the password strength score over time and provide the output in response to a detection that the password strength score exceeds a risk threshold.

In certain embodiments, the password semantic analysis pipeline model is a Natural Language Processing (NLP) model trained to output a probability that the data structure input as the password is the known syntax type or the recognized entity and input data provided to train the password semantic analysis pipeline model includes a list of commonly used passwords in the given network environment.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects and features made apparent to those skilled in the art by referencing the accompanying drawings.

The disclosure is susceptible to modifications and alternative forms and specific embodiments of the disclosure are provided as examples. The drawings and detailed description are not intended to limit the disclosure to the form disclosed and cover modifications, equivalents and alternatives falling within the spirit and scope of the disclosure as defined by the claims.

DETAILED DESCRIPTION

Introduction

Password validation on websites that implement web applications is typically standardized but extremely rudimentary—even in modern computing environments. For example, a significant portion of existing password validation mechanisms do nothing more than enforce basic lexical rules during password creation that is a combination of mixed case, numbers, and symbols (e.g., Rizz0%^&). Although a password that is a combination of text, numbers, and symbols is potentially stronger than creating a password with just text, number, or symbols, individually—existing password policies and checking mechanisms are hamstrung by such simplistic lexical rules because they do not account for semantic analysis of passwords.

What's more, even machine learning paradigms implemented to improve password strength merely focus on supervised machine learning techniques (e.g., a Support Vector Machine, among others) to predict whether a password is satisfactory from a strength and predictability perspective (e.g., with respect to potential compromise). Unfortunately, what is not taken into consideration in existing password validation mechanisms is whether the separate, and/or disparate components of a user-proposed password individually and/or collectively pose a weakness risk with respect to password strength.

Example Password Semantic Analysis Pipeline

Figure 1:
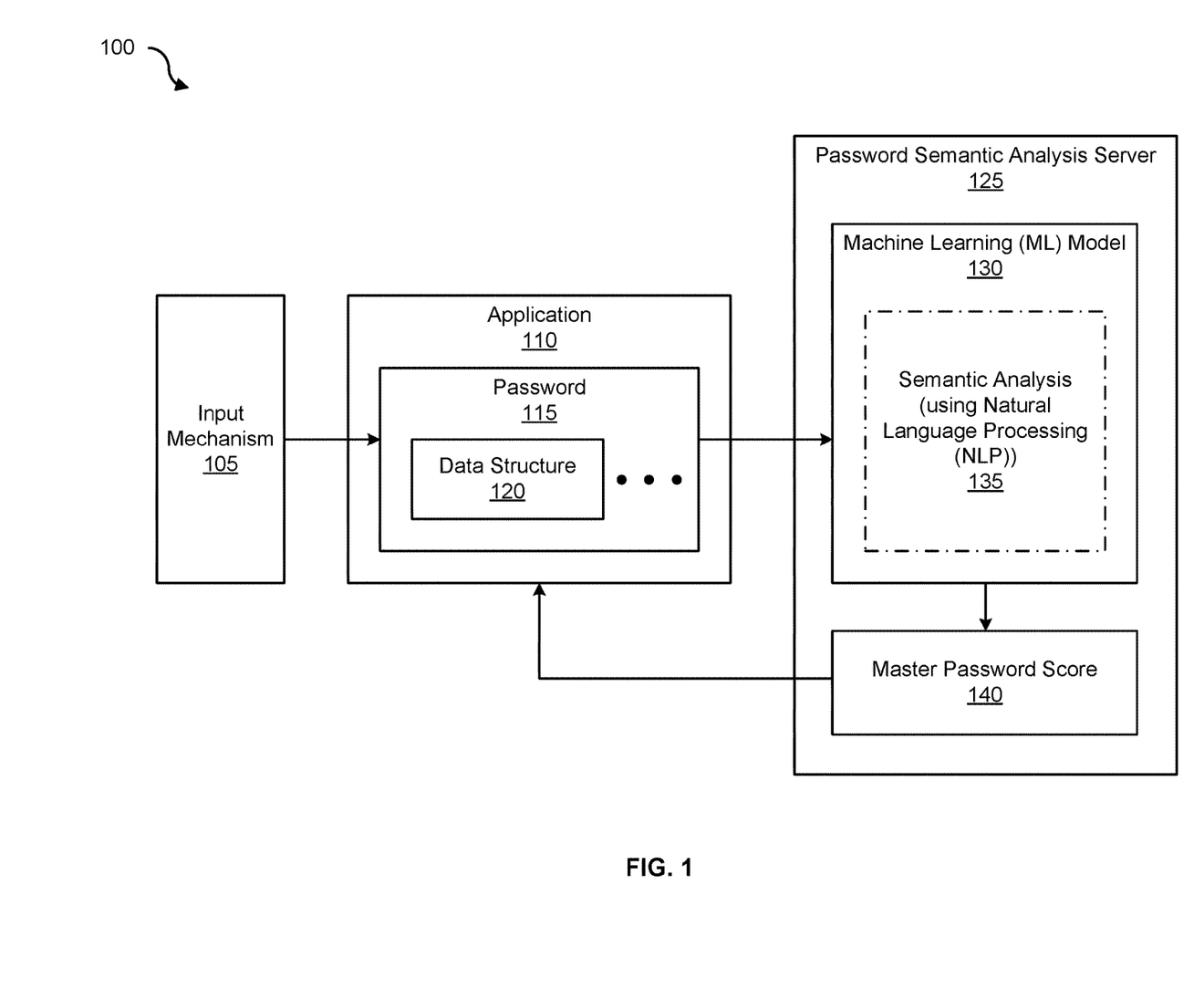
FIG. 1 is a block diagram 100 of a password semantic analysis pipeline, according to one embodiment of the present disclosure.

FIG. 1 is a block diagram 100 of a password semantic analysis pipeline, according to one embodiment. An input mechanism 105 (e.g., a physical or virtual keyboard) is used to input a (proposed) password 115 in an application 110 (e.g., a web application that requires password validation for access). Password 115 includes a data structure 120 (which can include any combination of text, numbers, and/or symbols).

In one embodiment, password 115 with data structure 120 that is received at application 110 from input mechanism 105 (e.g., a client computing device) is received by a password semantic analysis server 125 (which can be any type of physical or virtual computing device). The (non-transitory) memory of password semantic analysis server 125 implements and executes at least a machine learning (ML) model 130 that performs semantic analysis using Natural Language Processing (NLP) 135. The ML model 130 generates a master password score 140 that is then transmitted to application 110 validating the inputted password 115 (as strong or acceptable) or rejecting the inputted password 115 (as weak).

In one embodiment, ML model 130 determines whether password 115 is in proximity (e.g., within a certain standard deviation) to at least one hundred or more commonly used passwords in the given computing environment (e.g., based on user information retrieved from Active Directory (AD), and the like). The ML model then implements one or more machine learning techniques (e.g., NLP) to determine whether password 115 contains guess-able elements (e.g., birthdays, sports teams, and the like) that exceed a predetermined threshold.

Named entities pose a significant problem in existing password validation mechanisms that typically deem such proposed passwords as acceptable in the vast majority of situations without any further analysis. Named entities (e.g., names, birthdays, and the like) are typically easily predictable by a malicious hacker (e.g., using basic internal research and a brute force methodology). For example, in existing systems a password proposed by user John Doe—Rizzo2002!@#, where Rizzo is the name of John Doe's dog and 2002 is the birth year of John Doe's spouse, is easily guessable. Although the foregoing password includes uppercase and lowercase letters, numbers, and special characters (and thus satisfies most lexical constructs), the password itself is extremely weak from a compromise standpoint.

Therefore, in one embodiment, password semantic analysis server 125 implements ML model 130 that performs semantic analysis based on named entities because named entities are ubiquitous in passwords and typically hold a high level of significance to a user (and are thus the weak point in the password). In this example, the password semantic analysis pipeline includes configurable steps that permits variations in terms of how 'strong' the password validation analysis should be (e.g., based on various factors discussed below).

In some embodiments, and in a first stage of the password semantic analysis pipeline, ML model 130 implements Levenshtein distance (e.g., a string metric for measuring the difference between two sequences—a distance between two words that is the minimum number of single-character edits (insertions, deletions, or substitutions) required to change one word into the other) to determine whether password 115 is within a proximity of one of the hundred (or more) commonly used (or seen) passwords (e.g., in a given year, in a given company or organization, in a given computing environment, in a given country, and the like). In this example, the acceptable distance implemented and/or used by ML 130 is two (2) (e.g., a common password can be created and realized with 2 deletions, inserts, or modifications). However, in other embodiments, this number can be configurable and/or changed by a user.

In certain embodiments, and in a second stage of the password semantic analysis pipeline, password 115 is split by special characters (e.g., !@#$%^&*"?, and the like) and is then grouped into tokens (e.g., chunks) of text and numbers. In the above password example, Rizzo2002!@# would be split or chunked into Rizzo and 2002. The tokens (e.g., Rizzo and 2002) are then transmitted individually for syntax and named entity recognition (e.g., semantic analysis using NLP 135 as shown in FIG. 1). The analysis performed by ML model 130 indicates whether a given token (e.g., Rizzo or 2002) is a known type of syntax (e.g., a verb) or a recognized entity (e.g., a person) as well as to what likelihood ML model 130 believes the foregoing to be true (e.g., by generating a token confidence score).

In one embodiment, the syntax found is based a predetermined list of parts of speech that includes nouns, pronouns, adjectives, determiners, verbs, adverbs, prepositions, conjunctions, and interjections. In other embodiments, named entities include commercial items, dates, events, locations, organizations, persons, quantities, and titles.

In some embodiments, (1) commercial item includes branded products, (2) date includes a full date (e.g., 11/25/17, day (Tuesday), month (May), or time (8:30 a.m.), (3) event includes an event such as a festival, a concert, an election, and the like, (4) location includes a specific location such as a country, a city, a lake, a building, and the like, (5) organization includes a government, a company, a religion, a sports team, and the like, (6) person includes individuals, groups of people, nicknames, and fictional characters, (7) quantity includes a quantified amount such as a currency, percentages, numbers, bytes, and the like, and (8) title includes an official name given to a creation or a creative work such as movies, books, songs, and the like. The foregoing can be part of input data that is used to train ML model 130. The input mapping is based on a token that is determined to be a named entity to at least one named entity in the list of named entities noted above and provided to train ML model 130 to perform semantic analysis using NLP 135.

In certain embodiments, for each token, in addition to a confidence factor generated by ML model 130, a weight factor is used to determine whether the given token is significant (e.g., actionable). For example, if a given token is identified as a named entity, then the token is significant and/or actionable (e.g., the token is a weak part or component of the proposed password). In this example, named entities, given their vulnerable nature as part of potentially weak passwords, are weighted higher than other metrics (e.g., a date in a password that is associated with a user is significant and thus, actionable). In this manner, multiple entity recognition is incorporated into the semantic analysis of passwords.

In one embodiment, ML model 130 is trained to recognize one or more verbs in password 115 and determines whether the given verb is 'acting' on a text or a number that follows the verb. In another embodiment, ML model 130 is trained to recognize and identify adjectives or other syntax that hold significance with respect to password 115 (or a user of password 115—for example, based on such a user being identified in a given computing environment based on AD, employee groups, user groups, and the like). In certain embodiments, a mapping of special characters to regular characters (e.g., $→s) is added (or provided) to ML model 130 pre-analysis (e.g., so that multiple passes can be performed over password 115). In this manner, the consideration of named (or known) entities and 'active' syntax is considered for password validation while special character mapping ensures accurate password decomposition.

Example of Dual-Phase Entity and Syntax-Based Password Validation

Figure 2:
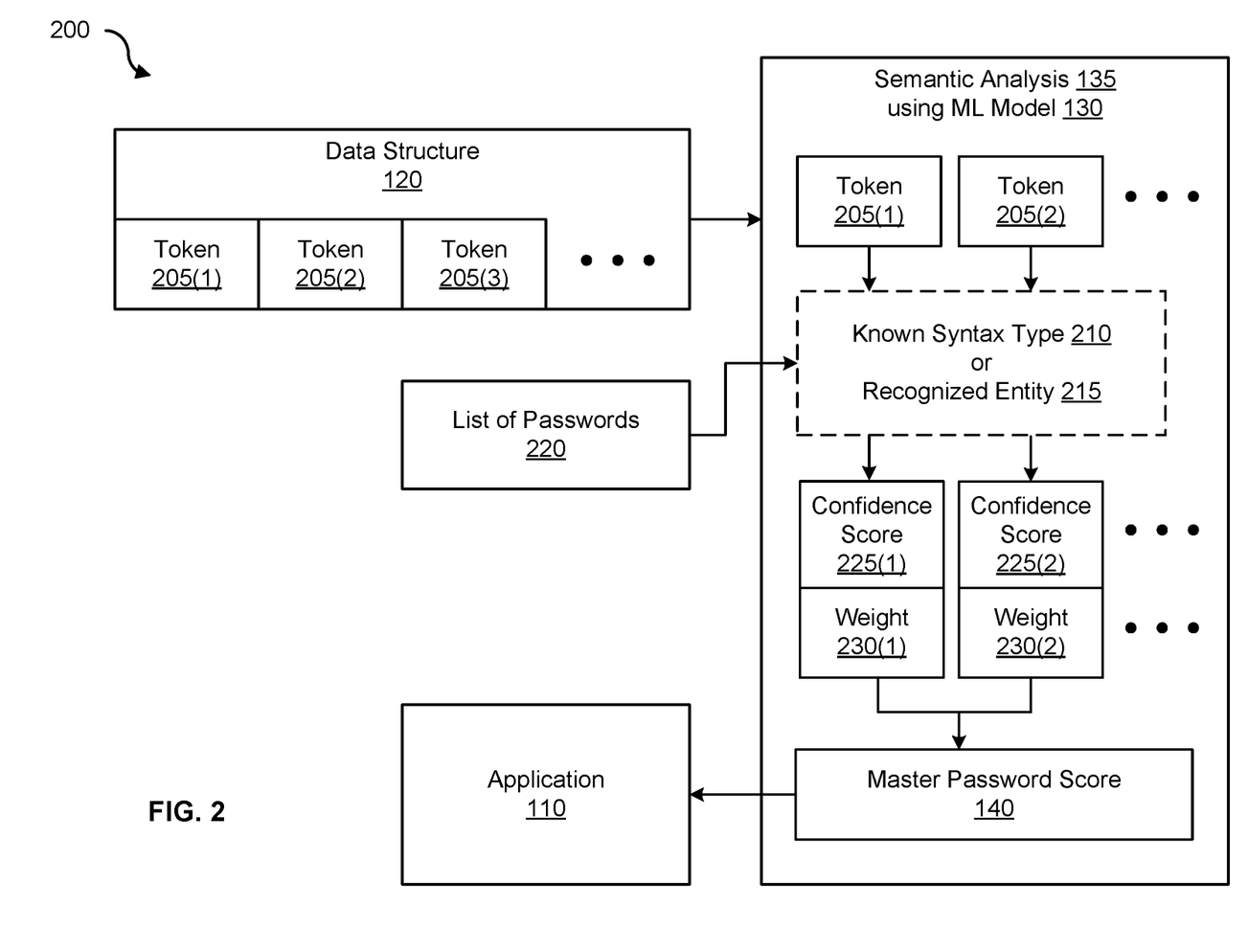
FIG. 2 is a block diagram 200 of a password semantic analysis pipeline, according to one embodiment of the present disclosure.

FIG. 2 is a block diagram 200 of a password semantic analysis pipeline, according to one embodiment. Data structure 120 that is input as password 115 is received in application 110. Data structure 120 is transmitted to ML model 130 that implements semantic analysis 135 (e.g., using ML model 130). As shown in FIG. 2, ML model 130 implements and executes a password semantic analysis pipeline that performs semantic analysis 135 by processing data structure 120 to perform password validation.

In one embodiment, processing data structure 120 using ML model 130 involves chunking data structure 120 into tokens 205(1)-(N) (e.g., chunks) that include text and/or numbers. For each token (e.g., a text token and a number(s) token), one or more NLP methodologies are applied to determine whether the token is a known syntax type 210 or a recognized entity 215 (e.g., as shown in FIG. 2). In some embodiments, to perform (known) syntax analysis, identification, or determination, grammar induction, lemmatization, morphological segmentation, part-of-speech tagging, parsing, sentence breaking, stemming, word segmentation, or terminology extraction is contemplated or used. In other embodiments, to perform recognized entity analysis, determination, or identification, lexical semantics, distributional semantics, machine translation, named entity recognition (NER), natural language generation, natural language understanding, optical character recognition (OCR), question answering, recognizing textual entailment, relationship extraction, sentiment analysis (e.g., multimodal sentiment analysis), topic segmentation and recognition, or word sense disambiguation is contemplated or used.

ML model 130 applies one or more of the above-referenced NLP techniques or methodologies to generate confidence scores for each token 205(1)-(N) (e.g., confidence scores 225(1)-(N)). The confidence score permits password semantic analysis server 125 to determine whether a given token is actionable (e.g., whether token 205(1) is known syntax type 210 or recognized entity 215) by combining or amalgamating confidence score 225(1) associated with token 205(1) with a pre-determined weight factor associated with known syntax type 210 or recognized entity 215 (e.g., weight 230(1) as shown in FIG. 2). Finally, ML model 130 generates master password score 140 for data structure 120, and transmits master password score 140 to application 110 (as shown in FIG. 2).

In some embodiments, ML model 130 is provided (e.g., by password semantic analysis server 125) a list of commonly used passwords (e.g., list of passwords 220 as shown in FIG. 2) and applies Levenshtein distance to determine whether data structure 120 is proximate to at least one password in list of passwords 220 (e.g., within one or more standard deviations). In this example, recognized entity 215 includes at least a commercial term, a date, an event, a location, an organization, a person, a quantity, or a title. In other embodiments, data structure 120 is processed by ML model 130 using one or more NLP methodologies to determine whether a given token is a verb or a noun. Based on the foregoing processing, the pre-determined weight factor associated with known syntax type 210 or recognized entity 215 is adjusted or modified (e.g., named entities can be weighted higher). In one example, ML model 130 is provided a mapping of special characters to regular characters.

Example Machine Learning Model Structure for Password Semantic Analysis

In one embodiment, ML model 130 includes a model structure that performs a combination of lemmatization and morphological segmentation of data structure 120 (e.g., sequentially or separately). For example, ML model 130 first determines a lemma of data structure 120 (e.g., particularly if a chunked token involves a verb). ML model 130 then performs morphology by separating the chunked token (e.g., a textual token) into individual morphemes to identify a class of the morphemes (e.g., particularly if at least part of the data structure is in the English language). In addition to lemmatization and morphological segmentation of data structure 120, ML model 130 can also perform stemming to reduce inflected (or derived) words to their root form. Therefore, ML model 130 includes ensembles to perform lemmatization, morphology, and/or stemming (sequentially or separately).

Example Training Process for Password Semantic Analysis Machine Learning Model

In some embodiments, parts of ML model 130 are trained with one or more subsets of list of passwords 220. For example, list of passwords 220 can include commonly used passwords based on organization or country. Depending on the geospatial or geographical location where input mechanism 105 and/or application 110 is located, a subset of list of passwords 220 associated with that specific geospatial or geographical location is used to train ML model 130 (or is provided to ML model 130). ML model 130 can also be trained in phases if list of passwords 220 includes commonly used passwords from the current year as well as preceding years.

Similarly, ML model 130 can be trained for named entity recognition by using a subset of input data that includes a combination of commercial terms, dates, events, locations, organizations, persons, quantities, and/or titles. For example, events and dates that correspond to a given year of particular importance ("particularity data") to a given organization (e.g., because a vast majority of the organization's employees joined the organization in that particular year or were born in that particular year) can be used to train ML model 130.

In certain embodiments, ML model 130 is trained using relationship extraction. For example, because passwords generally tend to involve persons and locations and/or the relationships between persons and locations (e.g., JohnLondon or J0hnL0nd0n), ML model 130 is trained to analyze a chunk of text (e.g., akin to token 205(1) during the execution phase) to identify relationships among entities (e.g., John [lives in] London). Similarly, because weak passwords can also typically tend to include a combination of events and dates (e.g., WeddingJune2019), ML model 130 is trained to perform topic segmentation to separate a chunk of text into segments, each of which is devoted to a topic, and identifies the topic of the segment.

In another embodiment, because weak passwords can often include a combination of a person (e.g., a spouse or one's child), event (e.g., a place of birth, place of residence, and the like), and a date (e.g., birthdays, wedding dates, and the like), ML model 130 is trained to implement an ensemble machine learning method that includes a combination of relationship extraction and topic segmentation to analyze data structure 120.

Example Process to Perform Password Semantic Analysis

Figure 3:
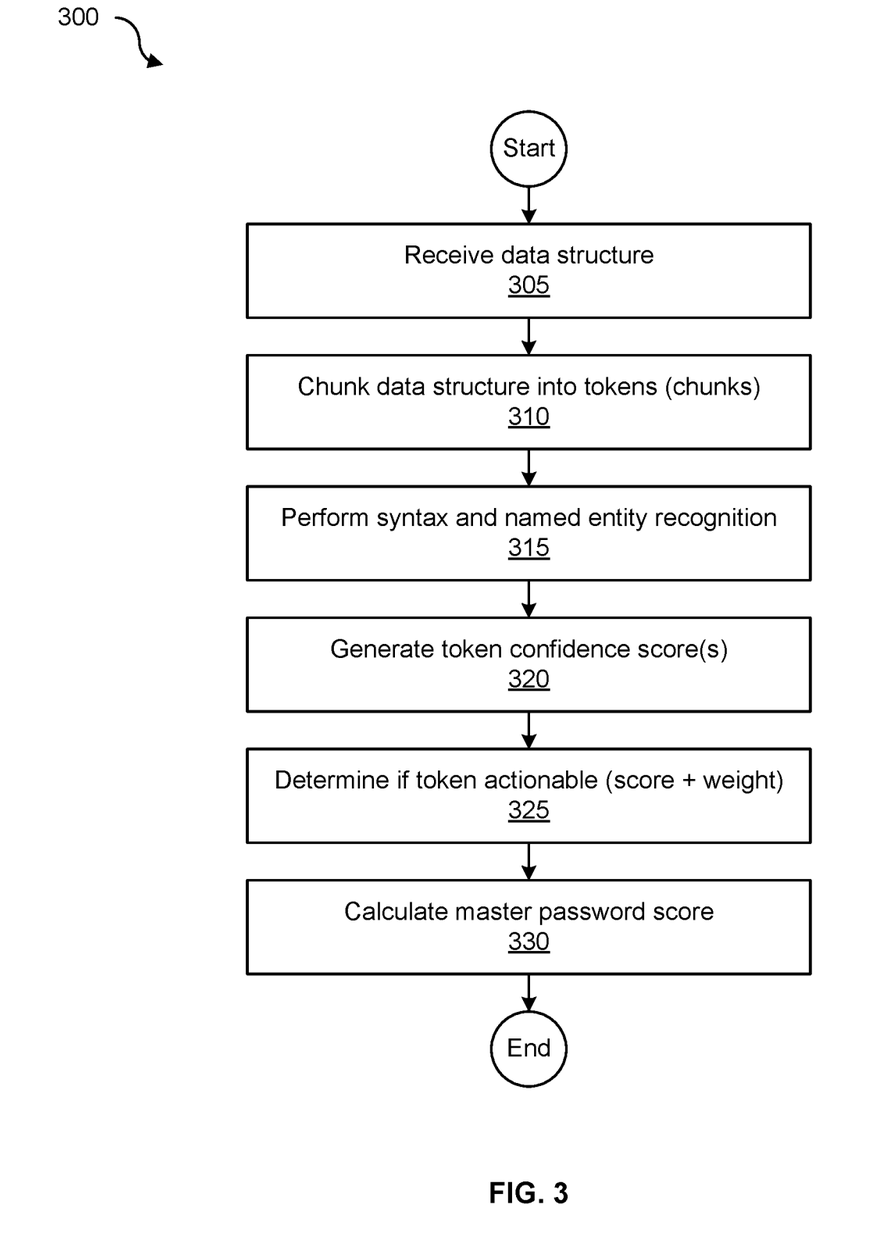
FIG. 3 is a flowchart 300 of a process for password validation using a password semantic analysis pipeline, according to one embodiment of the present disclosure.

FIG. 3 is a flowchart 300 of a process for password validation using a password semantic analysis pipeline, according to one embodiment. The process of FIG. 3 can be performed by a trained machine learning model (e.g., ML model 130). The process begins at 305 by receiving data structure 120. At 310, the process chunks data structure 120 into tokens (e.g., tokens 205(1), 205(2), and the like, as shown in FIG. 2). At 315, the process (e.g., (trained) ML model 130) performs syntax and named entity recognition (e.g., using a single NLP methodology or an ensemble of NLP methodologies, as discussed above). The process at step 315 determines whether a given token (e.g., 205(1) or 205(2)) is known syntax type 210 or recognized entity 215. The process at step 315 further involves determining whether a given token is part of list of passwords 220 based on a single NLP methodology or an ensemble of NLP methodologies.

At 320, the process generates confidence scores (e.g., confidence score 225(1) for token 205(1), confidence score 225(2) for token 205(2), and the like), and at 325, determines if the token is actionable (e.g., by calibrating confidence score 225(1) for token 205(1) and confidence score 225(2) for token 205(2) with weight 230(1) and weight 230(2), respectively). The process ends at 330 by calculating master password score 140 (which has been calibrated upward or downward based on weights 230(1)-(N) applied to confidence scores 225(1)-(N)) and transmits master password score 140 to application 110 (e.g., in the form of a notification or an alert that informs a user of application 110 that the inputted password 115 is weak and a new password is required to gain access to or perform other authenticated computing tasks).

Example Machine Learning Paradigms to Perform Password Semantic Analysis

In certain embodiments, password semantic analysis server 125 implements a password semantic analysis pipeline model (e.g., ML model 130 to perform semantic analysis 135 as shown in FIGS. 1 and 2) trained according to a machine learning technique (e.g., an ensemble of NLP techniques bolstered by list of passwords 220 as discussed above) to at least (a) determine, based on given characteristics data (e.g., employee names, employee spouse names, employee birthdates, employee family member names, employee location information, and other employee biodata or personally identifiable information (PII) from Active Directory (AD) or other comparable source (of training data)) of a given network environment (e.g., a group of clients, multiple hosts, a corporate entity, an organization, a cloud environment, and the like), whether each of multiple tokens that are chunked portions of data structure 120 input as password 115 in application 110 (e.g., tokens 205(1)-(N)) is known syntax type 210 or recognized entity 215, (b) generate, using the password semantic analysis pipeline model, a password strength score that is a combination of a confidence score determined for each of the plurality of tokens (e.g., confidence score 225(1) determined for token 205(1) as shown in FIG. 2) and a weight factor assigned to the known syntax type or the recognized entity (e.g., weight factor 230(1) assigned to either known syntax type 210 or recognized entity 215)), (c) apply the password strength score to data structure 120 input as password 115 in application 110 (e.g., master password score 140), and (d) provide an output to application 110 indicating whether data structure 120 input as password 115 is acceptable or unacceptable for continued access to application 110 (e.g., or whether one or more remediation actions are required or recommended).

In one embodiment, the password semantic analysis pipeline system is implemented as part of a network-accessible service configured to collect the characteristics data from one or more physical computing devices or one or more virtual computing devices in the given network environment and_provide the output indicating that data structure 120 input as password 115 is acceptable or unacceptable via a graphical user interface (GUI) of the network-accessible service. In this example, the network-accessible service is configured to monitor the password strength score over time and provide the output in response to a detection that the password strength score exceeds a risk threshold (e.g., within a certain amount of standard deviations of a known syntax type or recognized entity).

In some embodiments, the password semantic analysis pipeline model is a Natural Language Processing (NLP) model trained to output a probability that data structure 120 input as password 115 is known syntax type 215 or recognized entity 215 (e.g., a commercial term, a date, an event, a location, an organization, a person, a quantity, or a title). In this example, input data provided to train the password semantic analysis pipeline model includes a list of commonly used passwords (e.g., list of passwords 220) in the given network environment (e.g., based on employee biodata information as noted above). Levenshtein distance can be applied to determine whether data structure 120 is proximate to at least one password in the list of commonly used passwords (e.g., within a certain number of predetermined standard deviations).

In other embodiments, the password semantic analysis pipeline system is configured to process the data structure using one or more NLP methodologies (including ensemble methods, as discussed above) to determine whether the token is a verb or a noun, adjust the weight factor assigned to the known syntax type or the recognized entity, implement a mapping of special characters to regular characters, and perform one or more remediation actions if the output indicates that the data structure input as the password exceeds a risk threshold (e.g., update the application, disable a feature provided by the application, remove one or more access privileges of one or more users from the application, update one or more configuration settings of the application, isolate a machine executing the application, and the like). Such remediation actions can also be suggested or recommended in the form of a security alert or a notification transmitted (e.g., to a client machine or a host machine executing the application) using the network-accessible service disclosed herein.

Example Computing and Networking Environment

Figure 4:
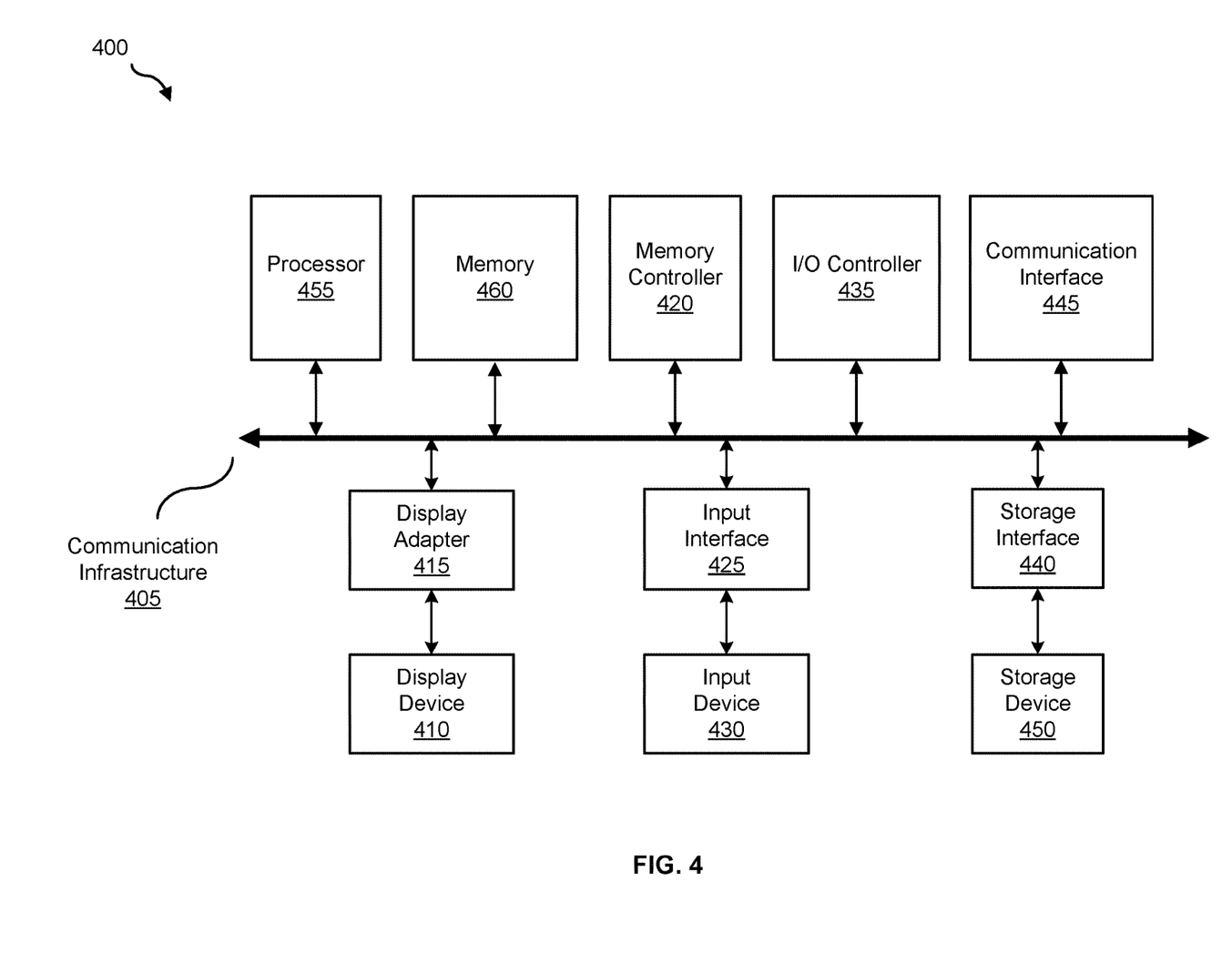
FIG. 4 is a block diagram 400 of a computing system that implements a machine learning paradigm, according to one embodiment of the present disclosure.

FIG. 4 is a block diagram 400 of a computing system that implements a machine learning paradigm to perform password semantic analysis, according to one embodiment of the present disclosure. Computing system 400 can include password semantic analysis server 125 and broadly represents any single or multi-processor computing device or system capable of executing computer-readable instructions (e.g., desktops, laptops, servers, mobile computing devices, endpoints, and the like). Computing system 400 can also be part of a network environment that implements a network-accessible service for password semantic analysis.

In its most basic configuration, computing system 400 may include at least one processor 455 and a memory 460. By executing the software that executes machine learning model 130, computing system 400 becomes a special purpose computing device that is configured to perform dual-phase calibrated password semantic analysis.

Processor 455 generally represents any type or form of processing unit capable of processing data or interpreting and executing instructions. In certain embodiments, processor 855 may receive instructions from a software application or module that may cause processor 855 to perform the functions of one or more of the embodiments described and/or illustrated herein. Memory 460 generally represents any type or form of volatile or non-volatile storage devices or mediums capable of storing data and/or other computer-readable instructions (e.g., random access memory (RAM), read only memory (ROM), flash memory, and the like). In one example, program instructions implementing ML model 130 may be loaded into memory 460 (from which tables, findings, determinations, identifications, indications, and results may be accessible by or transmitted to application 110 for password validation and authentication purposes).

In certain embodiments, computing system 400 may include a memory controller 420, an Input/Output (I/O) controller 435, and a communication interface 445, each of which may be interconnected via a communication infrastructure 405. Computing system 400 may also include at least one display device 410 coupled to communication infrastructure 405 via a display adapter 415 that generally represents any type or form of device capable of visually displaying information forwarded by display adapter 415.

Computing system 400 may also include at least one input device 430 coupled to communication infrastructure 405 via an input interface 425. Input device 430 generally represents any type or form of input device capable of providing input, either computer or human generated, to computing system 400. Examples of input device 430 include a keyboard, a pointing device, a speech recognition device, or any other input device (e.g., input mechanism 105).

Computing system 400 may also include storage device 450 coupled to communication infrastructure 405 via a storage interface 440. Storage device 450 generally represents any type or form of storage devices or mediums capable of storing data and/or other computer-readable instructions (e.g., instructions that implement ML model 130).

ML model 130 may be part of password semantic analysis server 125 or may be separate All or a portion of the embodiments disclosed herein may be encoded as a computer program and loaded onto, stored, and/or executed by ML model 130, and distributed over a network. In some examples, all or a portion of password semantic analysis server 125 may represent portions of a cloud-computing or network-based environment. These cloud-based services (e.g., software as a service, platform as a service, storage as a service, cloud storage platforms or resources, cloud-based object storage, infrastructure as a service, etc.) may be accessible through a web browser or other remote interface. The embodiments described and/or illustrated herein are not limited to the Internet or any particular network-based environment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A system comprising:
one or more hardware processors with associated memory that implement a password semantic analysis pipeline system, configured to:
implement a password semantic analysis pipeline model trained according to a machine learning technique, wherein
the password semantic analysis pipeline model is trained to determine, based on given characteristics data of a given network environment, whether each of a plurality of tokens that are chunked portions of a data structure input as a password in an application is a known syntax type or a recognized entity;
generate, using the password semantic analysis pipeline model, a password strength score, wherein
the password strength score is a combination of a confidence score determined for each of the plurality of tokens and a weight factor assigned to the known syntax type or the recognized entity;
apply the password strength score to the data structure input as the password is entered in the application; and
provide an output to the application indicating whether the data structure input as the password is acceptable or unacceptable for continued access to the application, wherein
the password semantic analysis pipeline system is configured to:
process the data structure using a Natural Language Processing (NLP) methodology to determine whether the token is a verb or a noun,
adjust the weight factor assigned to the known syntax type or the recognized entity,
implement a mapping of special characters to regular characters, or perform one or more remediation actions if the output indicates that the data structure input as the password exceeds a risk threshold.

2. The system of claim 1, wherein
the password semantic analysis pipeline system is implemented as part of a network-accessible service, configured to:
collect the characteristics data from one or more physical computing devices or one or more virtual computing devices in the given network environment; and
provide the output indicating that the data structure input as the password is acceptable or unacceptable via a graphical user interface (GUI) of the network-accessible service.

3. The system of claim 2, wherein
the network-accessible service is configured to:
monitor the password strength score over time; and
provide the output in response to a detection that the password strength score exceeds a risk threshold.

4. The system of claim 1, wherein
the password semantic analysis pipeline model is a Natural Language Processing (NLP) model trained to output a probability that the data structure input as the password is the known syntax type or the recognized entity.

5. The system of claim 1, wherein
input data provided to train the password semantic analysis pipeline model comprises a list of commonly used passwords in the given network environment, and
the password semantic analysis pipeline model applies Levenshtein distance to determine whether the data structure is proximate to at least one password in the list of commonly used passwords.

6. The system of claim 1, wherein
the recognized entity comprises at least a commercial term, a date, an event, a location, an organization, a person, a quantity, or a title.

7. A computer-implemented method, comprising:
performing, by one or more hardware processors with associated memory that implements a password semantic analysis pipeline system:
implementing a password semantic analysis pipeline model trained according to a machine learning technique, wherein
the password semantic analysis pipeline model is trained to determine, based on given characteristics data of a given network environment, whether each of a plurality of tokens that are chunked portions of a data structure input as a password in an application is a known syntax type or a recognized entity;
generating, using the password semantic analysis pipeline model, a password strength score, wherein
the password strength score is a combination of a confidence score determined for each of the plurality of tokens and a weight factor assigned to the known syntax type or the recognized entity;
applying the password strength score to the data structure input as the password is entered in the application; and
providing an output to the application indicating whether the data structure input as the password is acceptable or unacceptable for continued access to the application, wherein
the password semantic analysis pipeline system is configured to:
process the data structure using a Natural Language Processing (NLP) methodology to determine whether the token is a verb or a noun,
adjust the weight factor assigned to the known syntax type or the recognized entity,
implement a mapping of special characters to regular characters, or
perform one or more remediation actions if the output indicates that the data structure input as the password exceeds a risk threshold.

8. The computer-implemented method of claim 7, wherein
the password semantic analysis pipeline system is implemented as part of a network-accessible service, configured to:
collect the characteristics data from one or more physical computing devices or one or more virtual computing devices in the given network environment; and
provide the output indicating that the data structure input as the password is acceptable or unacceptable via a graphical user interface (GUI) of the network-accessible service.

9. The computer-implemented method of claim 8, wherein
the network-accessible service is configured to:
monitor the password strength score over time; and
provide the output in response to a detection that the password strength score exceeds a risk threshold.

10. The computer-implemented method of claim 7, wherein
the password semantic analysis pipeline model is a Natural Language Processing (NLP) model trained to output a probability that the data structure input as the password is the known syntax type or the recognized entity.

11. The computer-implemented method of claim 7, wherein
input data provided to train the password semantic analysis pipeline model comprises a list of commonly used passwords in the given network environment, and
the password semantic analysis pipeline model applies Levenshtein distance to determine whether the data structure is proximate to at least one password in the list of commonly used passwords.

12. The computer-implemented method of claim 7, wherein
the recognized entity comprises at least a commercial term, a date, an event, a location, an organization, a person, a quantity, or a title.

13. One or more non-transitory computer-accessible storage media storing program instructions that when executed on or across one or more processors implement at least a portion of a password semantic analysis pipeline system and cause the password semantic analysis pipeline system to:
implement a password semantic analysis pipeline model trained according to a machine learning technique, wherein
the password semantic analysis pipeline model is trained to determine, based on given characteristics data of a given network environment, whether each of a plurality of tokens that are chunked portions of a data structure input as a password in an application is a known syntax type or a recognized entity;
generate, using the password semantic analysis pipeline model, a password strength score, wherein
the password strength score is a combination of a confidence score determined for each of the plurality of tokens and a weight factor assigned to the known syntax type or the recognized entity;

apply the password strength score to the data structure input as the password is entered in the application; and provide an output to the application indicating whether the data structure input as the password is acceptable or unacceptable for continued access to the application, wherein the password semantic analysis pipeline system is configured to:

process the data structure using a Natural Language Processing (NLP) methodology to determine whether the token is a verb or a noun, adjust the weight factor assigned to the known syntax type or the recognized entity, implement a mapping of special characters to regular characters, or perform one or more remediation actions if the output indicates that the data structure input as the password exceeds a risk threshold.

14. The one or more non-transitory computer-accessible storage media of claim 13, wherein the password semantic analysis pipeline system is implemented as part of a network-accessible service, configured to:

collect the characteristics data from one or more physical computing devices or one or more virtual computing devices in the given network environment; and provide the output indicating that the data structure input as the password is acceptable or unacceptable via a graphical user interface (GUI) of the network-accessible service.

15. The one or more non-transitory computer-accessible storage media of claim 14, wherein the network-accessible service is configured to:

monitor the password strength score over time; and provide the output in response to a detection that the password strength score exceeds a risk threshold.

16. The one or more non-transitory computer-accessible storage media of claim 13, wherein the password semantic analysis pipeline model is a Natural Language Processing (NLP) model trained to output a probability that the data structure input as the password is the known syntax type or the recognized entity.

17. The one or more non-transitory computer-accessible storage media of claim 13, wherein input data provided to train the password semantic analysis pipeline model comprises a list of commonly used passwords in the given network environment, and the password semantic analysis pipeline model applies Levenshtein distance to determine whether the data structure is proximate to at least one password in the list of commonly used passwords.

18. The one or more non-transitory computer-accessible storage media of claim 13, wherein the recognized entity comprises at least a commercial term, a date, an event, a location, an organization, a person, a quantity, or a title.

* * * * *